US006167798B1

(12) United States Patent
Weinstein et al.

(10) Patent No.: US 6,167,798 B1
(45) Date of Patent: Jan. 2, 2001

(54) COOKER DIE AND ROTARY CUTTER REMOVABLY SECURING MECHANISM

(75) Inventors: James N. Weinstein, Maple Grove; Thomas G. Cremers, Green Isle; Thomas L. Smith, Greenfield; Steven C. Robie, Plymouth, all of MN (US)

(73) Assignee: General Mills, Inc., Minneapolis, MN (US)

(*) Notice: Under 35 U.S.C. 154(b), the term of this patent shall be extended for 0 days.

(21) Appl. No.: 09/552,741

(22) Filed: Apr. 19, 2000

(51) Int. Cl.$^7$ ............... A23L 1/00; A23P 1/00; F16L 19/00; F16L 23/036
(52) U.S. Cl. .............. 99/353; 99/450.1; 99/450.7; 285/27; 285/360; 425/184; 425/204
(58) Field of Search .............. 99/353–355, 450.1–450.8, 99/342, 348, 483; 264/209.2; 285/27, 360–363, 912, 913; 366/290, 291, 83–86; 425/183–185, 204, 131.1, 378.1, 463, 133.1, 462; 426/231–233, 448, 449, 514–516, 523

(56) References Cited

U.S. PATENT DOCUMENTS

| 363,133 | 5/1887 | Gavit . |
| 896,551 | * 8/1908 | Jurgens ........................ 366/149 X |
| 1,946,740 | 2/1934 | Hall . |
| 2,005,996 | * 6/1935 | Kraft ........................................ 99/348 |
| 2,078,100 | 4/1937 | Royle . |

(List continued on next page.)

FOREIGN PATENT DOCUMENTS

| 587117 | 4/1977 | (CH) . |
| 1452372 | 8/1973 | (DE) . |
| 2457532 | 6/1976 | (DE) . |
| 3029767 | 5/1982 | (DE) . |

(List continued on next page.)

OTHER PUBLICATIONS

Lihotzky, "Changers Made To Measure", No. 002–02, Sep. 1998 (6 pages), re European Patent No. 95 109 541.3 (extruders made to measure, 3–seconds–multifunctional screen, die and pelletizing knife changers and tool changer for all extruder systems).

Beringer Self–Lock Screen Changer for processing thermo–plastics and other compounds. Beringer, Beringer Way, P.O. Box 485, Marblehead, Mass. 01945, Jan. 1993.

(List continued on next page.)

*Primary Examiner*—Timothy F. Simone
(74) *Attorney, Agent, or Firm*—John A. O'Toole; Douglas J. Taylor; Alan D. Kamrath

(57) ABSTRACT

A mechanism (10) includes a slide plate (32) having die openings (38) adapted to hold dies (42a, 42b) and slideable relative to a cooker/extruder (12). Rotary cutters (74) are rotatably mounted relative to and moveable with the dies (42a, 42b). In one preferred form, a motor (76) can be connected and disconnected to the rotary cutter (74) aligned with the cooker/extruder (12) by a male coupling (96) including an elastomeric band (106) tensioned in a groove (102) formed in an outer peripheral surface (100) and received within the inside surface (116) of a cylindrical body (114) of a female coupling (108). Thus, it is not necessary to shut down the cooker/extruder (12) to service or change the dies (42a, 42b) and/or the rotary cutters (74). An annular wear plate (134) is sandwiched between the slide plate (32) and a frame element (18) having a central aperture (126) into which the barrel (14) of the cooker/extruder (12) is slideably received. A center plate (130) extends through the wear plate (134) and is received within the central aperture (126) and is fastened to the barrel (14). Mixer elements (59) are retained in the subpassageways (124) of the barrel (14) by the center plate (130) and can be removed through one of the die openings (38) when the die (42a, 42b) is removed therefrom and without removal of the barrel (14) from the frame element (18).

21 Claims, 4 Drawing Sheets

U.S. PATENT DOCUMENTS

| | | |
|---|---|---|
| 2,838,084 | 6/1958 | Samler . |
| 3,001,485 | 9/1961 | Czik . |
| 3,064,908 * | 11/1962 | Hjelte ................................ 366/194 X |
| 3,084,810 | 4/1963 | Vogel . |
| 3,130,468 | 4/1964 | McFall . |
| 3,139,844 | 7/1964 | Landers . |
| 3,299,474 | 1/1967 | Ashworth, Jr. . |
| 3,345,854 | 10/1967 | Gross . |
| 3,354,686 | 11/1967 | Petsch . |
| 3,391,565 | 7/1968 | Linnerz et al. . |
| 3,543,557 | 12/1970 | Lomas . |
| 3,599,467 | 8/1971 | Valks . |
| 3,739,711 * | 6/1973 | Nieblach ................................ 99/348 |
| 3,834,208 | 9/1974 | Schmidt . |
| 3,893,811 * | 7/1975 | Good et al. ...................... 366/149 X |
| 3,947,202 | 3/1976 | Göller et al. . |
| 4,048,473 * | 9/1977 | Burkhart ............................ 99/331 X |
| 4,395,212 | 7/1983 | Lambertus . |
| 4,422,372 | 12/1983 | Hoezee ................................. 99/353 |
| 4,463,572 * | 8/1984 | Brown, Jr. .......................... 62/342 X |
| 4,468,322 | 8/1984 | Fogarty, Jr. et al. . |
| 4,569,815 | 2/1986 | Rentz et al. . |
| 4,615,894 | 10/1986 | Ruegg ..................................... 26/516 |
| 4,630,533 | 12/1986 | Schaaf et al. .................. 99/450.7 X |
| 4,652,225 | 3/1987 | Dehennau et al. . |
| 4,653,281 * | 3/1987 | Van Der Veer ..................... 62/342 X |
| 4,702,608 * | 10/1987 | Garber et al . ....................... 366/146 |
| 4,722,357 | 2/1988 | Bormiolo ............................. 285/912 |
| 4,733,607 * | 3/1988 | Star et al. .............................. 99/348 |
| 4,758,097 * | 7/1988 | Iles, Sr. ................................ 366/149 |
| 4,859,165 | 8/1989 | Hoashi ............................... 425/133.1 |
| 4,875,847 | 10/1989 | Wenger et al. .................... 366/85 X |
| 4,960,043 | 10/1990 | Van Lengerich ........................ 99/353 |
| 4,984,514 | 1/1991 | Van Lengerich ................... 99/348 X |
| 4,990,022 | 2/1991 | Watanabe et al. .................... 285/362 |
| 5,013,498 | 5/1991 | Froeschke . |
| 5,190,772 | 3/1993 | Conselvan et al. . |
| 5,329,842 * | 7/1994 | Zittel ..................................... 99/348 |
| 5,333,538 | 8/1994 | Sawa ............................ 425/131.1 X |
| 5,403,603 | 4/1995 | McCullough et al. ............... 426/233 |
| 5,427,015 * | 6/1995 | Zittel ..................................... 99/348 |
| 5,433,490 | 7/1995 | Hurd et al. . |
| 5,435,236 | 7/1995 | Weinstein et al. ..................... 99/353 |
| 5,525,052 | 6/1996 | Czarnetzki et al. . |
| 5,577,437 | 11/1996 | Hurd . |
| 5,665,402 | 9/1997 | Czarnetzki et al. . |
| 5,776,534 | 7/1998 | Christensen et al. . |
| 5,919,509 | 7/1999 | Cremers et al. . |

FOREIGN PATENT DOCUMENTS

| | | |
|---|---|---|
| 3243184 | 5/1984 | (DE) . |
| 9504119 | 8/1996 | (DE) . |
| 2601619 | 1/1988 | (FR) . |
| 2070485 | 9/1981 | (GB) . |
| 592409 | 8/1959 | (IT) . |
| 0225726 | 11/1985 | (JP) . |
| 0225728 | 11/1985 | (JP) . |
| 7304519 | 10/1973 | (NL) . |

OTHER PUBLICATIONS

Beringer Ultra–Lock Slide Plate Screen Plate Changer, Beringer, Beringer Way, P.O. Box 485, Marblehead, Mass 01945–9978, Sep. 1994.

* cited by examiner

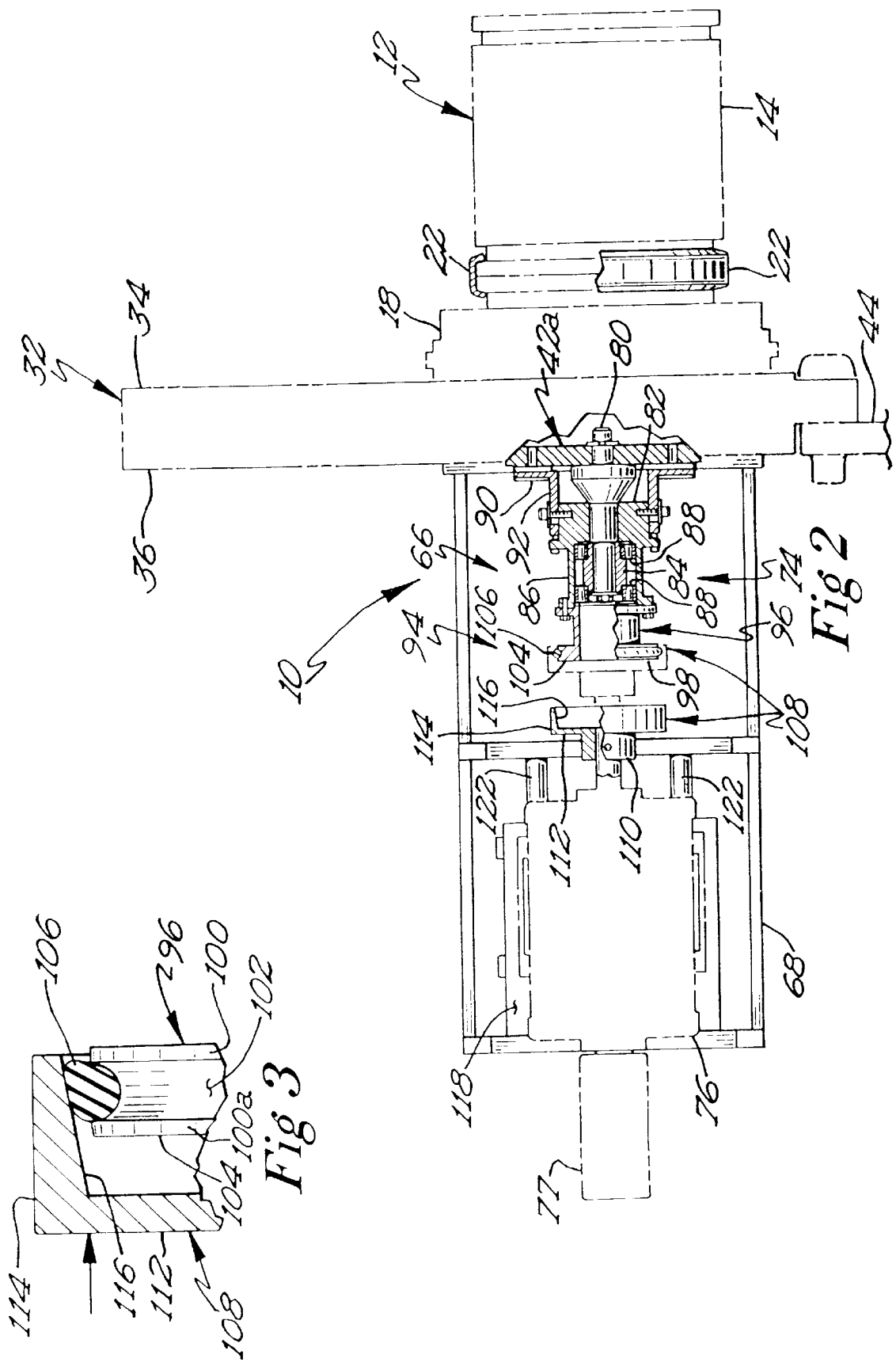

COOKER DIE AND ROTARY CUTTER REMOVABLY SECURING MECHANISM

BACKGROUND

The present invention generally relates to mechanisms for removably securing a die and rotary cutter to the discharge of a cooker and particularly relates to mechanisms for allowing the quick and easy change of a die and rotary cutter to the discharge of a cooker and for allowing ease of servicing of the barrel of the cooker.

During the normal operation of a cooker/extruder, it becomes necessary and/or desirable to change the die from which the extrudate passes from the cooker and/or the rotary cutter which cuts the extrudate passing from the die. For example, the die often becomes plugged, requiring it to be replaced with a clean one. Dies for forming complexly shaped products are especially prone to plugging and other die complications. Similarly, the die may be replaced with a die extruding extrudates of a differing configuration and/or size. Conventionally, dies were secured to cookers by a plurality of fasteners which were required to be removed and replaced each time the die was desired to be replaced. In addition to being very time consuming, removal and replacement of such fasteners typically required several personnel including mechanics. Further, in addition to personnel costs, the time required to replace the die takes the cooker out of production and loses the steady state conditions for the cooker.

U.S. Pat. No. 5,577,437 issued Nov. 26, 1996 discloses a cooker die removably securing mechanism representing a major advance in significantly reducing the time and personnel required to replace the die. Although not requiring taking the cooker out of production while the die was being changed, it was necessary to axially space the rotary cutter from the die to prevent the knives of the rotary cutter from catching on the die and/or slide plate. Although continuously rotating, dough, especially if of a sticky consistency, tended to bunch up under the knives when the cutter was retracted and before the new die was moved into position allowing the flow of food therethrough but before the rotary cutter was axially moved to abut the knives with the die, with the bunched up dough becoming sandwiched between the knives and the die face when the rotary cutter was axially slid back in place. Thus, the knives did not uniformly cut the extrudate, requiring the cooker to be taken out of production to remove the bunched up dough on the knives or to otherwise service the rotary cutter. Also, the knives of the rotary cutter wear and otherwise are damaged during normal operation such that the cooker had to be taken out of production whenever service was required on the rotary cutter.

Additionally, a conventional manner of mixing dough is by flowing the dough through static mixer elements in the flow passage. It can be appreciated that if the flow of dough is stopped for an extended period of time, the dough will harden or become sufficiently stiff so that it clogs the static mixer elements thereby preventing flow of the dough therethrough. In that event, it is necessary to remove the static mixer elements from the flow passage so that the hardened or stiff dough can be removed and the static mixer elements otherwise cleaned. Also, for that and other hygienic reasons, the static mixer elements are removed from the flow passage when food production is offline for an extended period such as for a weekend or the like. Substantial disassembly was required to gain access to the static mixer elements and reassembly was also required when food production was desired to be brought back online, which disassembly and reassembly being time consuming and requiring highly trained technicians.

Thus, a need exists for a mechanism that allows for the removable securement of the die and rotary cutter to the cooker which does not require the removal and replacement of a plurality of fasteners and which reduces the personnel required to replace the die and/or rotary cutter and which does not require the cooker to be taken out of production.

Additionally, a need exists for a mechanism that allows for the removal for cleaning or otherwise servicing of mixer elements in the flow passages while minimizing the requirement for disassembly (and reassembly) in both time, complexity, and personnel. In this regard, it would be desirable that such a mechanism providing ease of mixer element servicing also provides ease of removable securement of rotary cutters and/or dies to the cooker.

Likewise, a need exists for a mechanism that allows for ease of replacement of wear plates against which the slide plate holding dies slides and without requiring removal of the slide plate from the mechanism frame, with the wear plates preferably being sacrificial.

It is thus an object of the present invention to provide a novel mechanism for removably securing a die and rotary cutter to a cooker.

It is thus an object of the present invention to provide a novel mechanism for connecting and disconnecting a rotatable input to an output and allowing nonaxial movement between the input and output when disconnected and which is particularly adaptable for use but not limited for use with a cooker die and rotary cutter removably securing mechanism.

It is thus an object of the present invention to provide a novel mechanism for removing mixer elements from the flow passages while minimizing disassembly and reassembly.

It is further an object of the present invention to provide such a novel mixer element removing mechanism obtaining synergistic results in the removable securement of a die to the cooker elements.

It is further an object of the present invention to provide such a novel mixer element removing mechanism which does not require removal of the cooker from the mechanism frame to remove the mixer elements.

It is further an object of the present invention to provide such a novel mixer element removing mechanism providing plates between the slideable die and the cooker allowing reduced sliding force and without food leakage and which is especially advantageous for providing sliding seals for multiple flow passages.

It is further an object of the present invention to provide such a novel cooker die removably securing mechanism allowing for ease of replacement of wear plates against which the slide plate holding dies slides and without requiring removal of the slide plate from the mechanism frame.

It is further an object of the present invention to provide such a novel cooker die and rotary cutter removably securing mechanism which does not require fasteners between the flange of the cooker and the die and rotary cutter.

It is further an object of the present invention to provide such a novel cooker die and rotary cutter removably securing mechanism which does not require the cooker to be taken out of production to replace or otherwise service the die and/or rotary cutter.

It is further an object of the present invention to provide such a novel cooker die and rotary cutter removably securing mechanism which reduces the personnel required to replace the die and/or rotary cutter.

It is further an object of the present invention to provide such a novel cooker die and rotary cutter removably securing mechanism resulting in improved product quality due to more frequent die and/or rotary cutter changes.

It is further an object of the present invention to provide such a novel cooker die and rotary cutter removably securing mechanism resulting in quicker system start-ups such as following down weekends.

It is further an object of the present invention to provide such a novel cooker die and rotary cutter removably securing mechanism resulting in increased productivity.

It is further an object of the present invention to provide such a novel cooker die and rotary cutter removably securing mechanism having reduced ingredient losses.

SUMMARY

Surprisingly, the above objects and other aims can be satisfied in the field of securing dies and rotary cutters to cookers by providing, in the preferred form, a slide plate including first and second die openings and slideable between a first position with the first die opening aligned therewith and a second position with the second die opening aligned therewith. A cutter assembly is mounted to the mechanism frame element for carrying thereby, with the cutter assembly including a rotary cutter rotatably engaged with each of the dies and moveable with the slide plate and dies. The rotary cutters are connected to and rotated by a motor when aligned with the cooker.

In further aspects of the present invention, a single motor is connected and disconnected to the rotary cutter of the die aligned with the cooker by a mechanism including a male coupling having an outer interface surface which is axially, slideably received in the inside interface surface of a female coupling.

In other aspects of the present invention, a center plate received within a central aperture of a frame element and fixed to a barrel of a food cooker/extruder slideably received within the central aperture of the frame element prevents mixer elements from passing from the subpassageways of the barrel, with the mixer elements being removable from the subpassageways of the barrel after removal of the cooker die and of the center plate but without removal of the barrel from the frame element.

In still other aspects of the present invention, an annular wear plate is sandwiched between the barrel of a cooker/extruder and a slide plate including die openings for receiving dies which can be aligned with the barrel of the cooker/extruder, with a center plate passing through the wear plate and being fixable to and removable from the barrel of the cooker/extruder through a die opening in the slide plate aligned with the barrel of the cooker/extruder.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a partial, cross-sectional view of the cooker die and rotary cutter removably securing mechanism of FIG. 1 according to section lines 2—2 of FIG. 1, with portions shown in phantom.

FIG. 3 shows a partial, enlarged, cross-sectional view of the mechanism for connecting and disconnecting a rotatable input to an output included in the cooker die and rotary cutter removably securing mechanism of FIG. 1.

Figure 1:
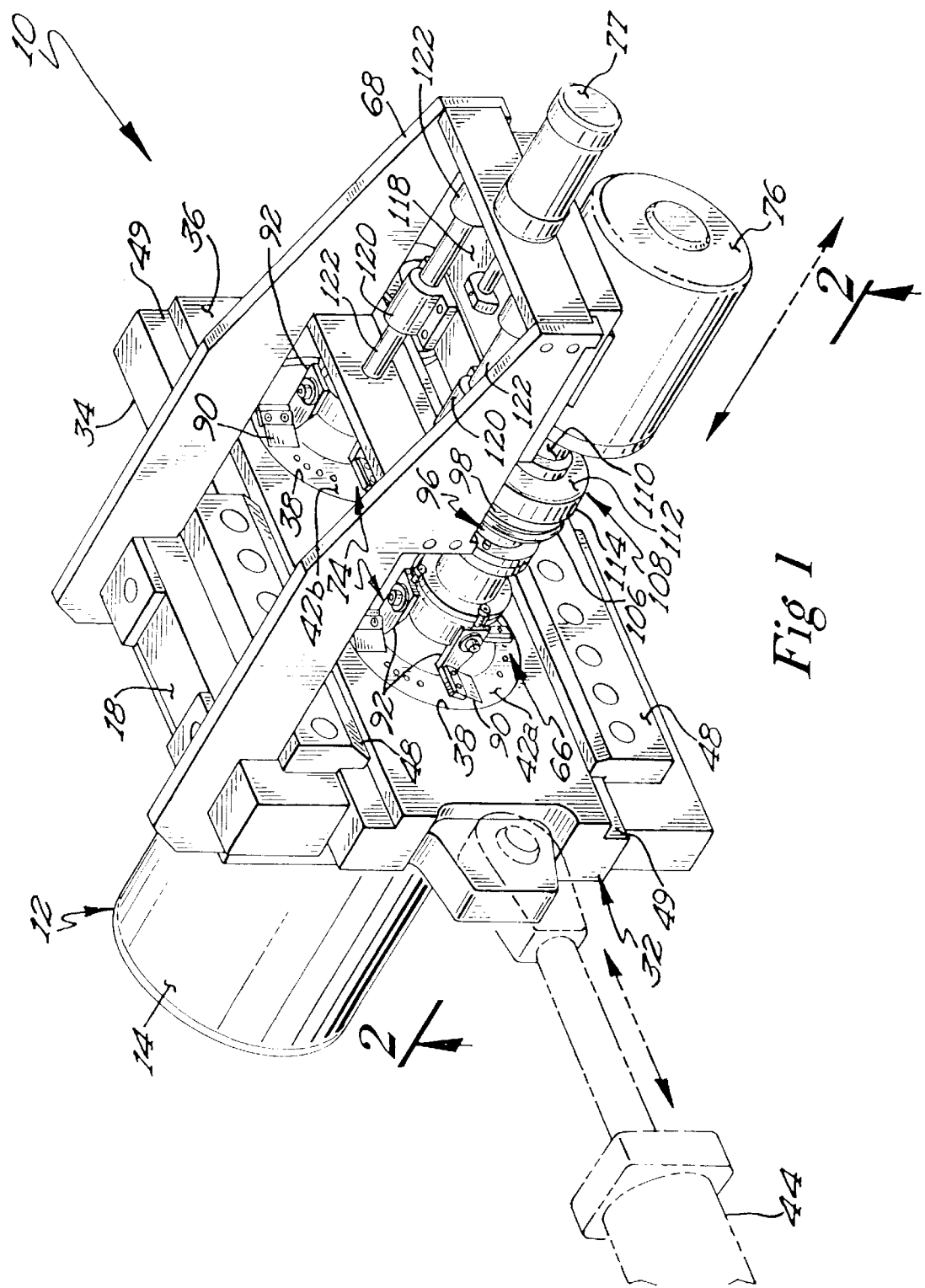
FIG. 1 shows a perspective view of a mechanism for removably securing a die and rotary cutter to a cooker/extruder according to the preferred teachings of the present invention, with portions shown in phantom to show constructional details.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "front", "back", "height", "width", "length", "end", "side", "horizontal", "vertical", "axial", "radial", and similar terms are used herein, it should be understood that these terms have reference only to the structure shown in the drawings as it would appear to a person viewing the drawings and are utilized only to facilitate describing the preferred embodiment.

DESCRIPTION

A mechanism for removably securing a die and rotary cutter to a continuous cooker/extruder for allowing the quick and easy removal and/or installation of the die and rotary cutter to the cooker/extruder according to the preferred teachings of the present invention is shown in the drawings and generally designated 10. In the most preferred embodiment of the present invention, mechanism 10 is an improvement of the type shown and described in U.S. Pat. No. 5,577,437. For purpose of explanation of the basic teachings of the present invention, the same numerals designate the same or similar parts in the present figures and the figures of U.S. Pat. No. 5,577,437. The description of the common numerals and mechanism 10 may be found herein and in U.S. Pat. No. 5,577,437, which is hereby incorporated herein by reference.

Mechanism 10 of the most preferred form can be utilized on a continuous cooker/extruder 12 including a barrel 14, with cooker/extruder 12 being of any desired configuration including but not limited to of the type shown in U.S. Pat. Nos. 5,577,437; 5,776,534; or 5,919,509, each of which are incorporated herein by reference. Mechanism 10 generally includes a mechanism frame element 18 which is secured in a fixed position relative to barrel 14 of cooker/extruder 12 by any suitable means. In the most preferred form shown, each of barrel 14 and frame element 18 includes a groove spaced from but adjacent to their axial ends for receipt of a clamp 22. However, it can be appreciated that mechanism frame element 18 can be mounted to cooker/extruder 12 in a variety of manners depending upon the particular cooker/ extruder 12. In the most preferred form shown, barrel 14 and cooker/extruder 12 are arranged horizontally.

Mechanism 10 further includes a horizontal slide plate 32 including spaced, planar, parallel, upstream and downstream surfaces 34 and 36 extending generally perpendicular to the axis of barrel 14 and cooker/extruder 12. Upstream surface 34 abuts against and slides on the free end of barrel 14 or an extension thereof. Slide plate 32 includes first and second die openings 38 extending from upstream surface 34 to downstream surface 36 and having parallel axes arranged in the same horizontal plane. First and second dies 42a and 42b of a standard design are slideably received in openings 38 and held therein by any desired locking techniques. Dies 42a and 42b have upstream surfaces which are generally coextensive with upstream surface 34 when dies 42a and 42b are received in openings 38.

First and second slide pressure plates 48 are held in a fixed position along the upper and lower edges of mechanism frame element 18 by any suitable means such as screws as shown and have their upstream faces slideably abutting with downstream surface 36 of slide plate 32. In the most preferred form, slide plate 32 includes linear shoulders 49 adjacent its upper and lower edges for slideably receiving pressure plates 48. It should then be appreciated that slide plate 32 is axially captured between frame element 18 and pressure plates 48, but is also laterally and horizontally slideable therebetween.

Mechanism 10 further includes a suitable mechanism 44 such as a hydraulic cylinder shown for sliding slide plate 32 relative to frame element 18 and cooker/extruder 12 and specifically to align one or the other of dies 42a and 42b with barrel 14. Hydraulic cylinder 44 is secured between frame element 18 and slide plate 32 and strokes slide plate 32 in a straight linear path in the preferred form.

According to the most preferred form of the present invention, mechanism 10 further includes a cutter assembly 66. Cutter assembly 66 generally includes a framework or cutter frame 68 held in a fixed position relative to cooker/extruder 12 and in the preferred form mounted to mechanism frame element 18. In the most preferred form, cutter frame 68 is suitably mounted to the upper edge of mechanism frame element 18. Cutter assembly 66 further includes first and second rotary cutters 74 rotatably mounted about a horizontal axis to abut with dies 42a and 42b, respectively, received in die openings 38 and moveable with slide plate 32. Rotary cutters 74 are of a diameter generally equal to die 42a or 42b and preferably less than openings 38. Rotary cutters 74 are rotated by suitable provisions such as an electric motor 76 shown. Motor 76 is slideably mounted to cutter frame 68 for axial movement relative to rotary cutters 74 between an engaged condition and a disengaged condition. Specifically in the preferred form, motor 76 is mounted to a mounting plate 118 including two pairs of linear bearings 120 slideable on first and second, parallel, slide shafts 122 secured inside cutter frame 68. Suitable provisions 77 such as an air cylinder may be provided to mechanically slide motor 76 in cutter frame 68, with air cylinder 77 mounted to frame 68 and including its piston rod connected to the mounting plate 118 of motor 76 in the most preferred form. For portability, mechanism 10 can be mounted on transport wheels in the most preferred form, and the mounting of cutter assembly 66 to mechanism frame element 18 allows movement as a unit from one cooker/extruder 12 to another in an emergency and makes it simple for storage, if necessary.

In the preferred form shown, first and second rotary cutters 74 are of an identical construction. First and second rotary cutters 74 are rotatably mounted relative to dies 42a and 42b and are mounted for movement with slide plate 32. In the most preferred form, each rotary cutter 74 includes a center shaft 80 extending axially from the respective die 42a or 42b and defining the rotation axis of rotary cutter 74. As an example, shaft 80 could be threadably received in die 42a or 42b, could extend through die 42a or 42b and be axially fixed thereto such as by a snap ring or by being threadably received in a nut, or the like. An annular cutter head 82 is suitably rotatably mounted on center shaft 80. In the most preferred form, a bearing spacer or hub 84 is suitably fixed on center shaft 80 such as by a bolt threadably received in the free end of center shaft 80 and sandwiching a washer against a shoulder formed in the central bore of hub 84 and the free end of center shaft 80. A cylindrical mount 86 is rotatably mounted to hub 84 by suitable provisions 88 such as first and second roller bearings as shown located and axially fixed between hub 84 and cylindrical mount 86. Cutter head 82 is suitably secured to the downstream face of mount 86 such as by being integrally formed therewith. A plurality of radially extending knives 90 abut and slide on the downstream face of die 42a or 42b and cut the food exiting die 42a or 42b into axial lengths. In the most preferred form, knives 90 are mounted to cutter head 82 by L-shaped brackets 92.

Cutter assembly 66 further includes suitable provisions 94 for disconnecting rotary cutters 74 from motor 76 when it is desired to slide slide plate 32 and thereby allowing nonaxial relative movement between motor 76 and rotary cutters 74 and for connecting motor 76 to rotary cutters 74 when aligned with barrel 14 and cooker/extruder 12 and in the most preferred form without stopping rotation of motor 76. In the most preferred form, provisions 94 includes a first cylindrical, male coupling 96 suitably attached to hub 84 of each rotary cutter 74 such as by screws. Coupling 96 includes a radially extending diametric flange 98 terminating in an outer, generally axially extending peripheral surface 100. A circumferential groove 102 is formed in surface 100 and is generally semicircular in cross section. The portion 100a of surface 100 intermediate groove 102 and the axial end 104 of coupling 96 opposite to knives 90 is beveled at a nonparallel angle to the axis of rotary cutter 74 defined by center shaft 82 and in the most preferred form extends at an angle in the order of 10° inwardly towards the rotation axis of rotary cutter 74 from groove 102 towards axial end 104. A rubber or similar elastomeric band 106 is positioned in groove 102 in a tensioned condition. Band 106 in the preferred form has circular cross sections of a diameter generally equal to the diameter of the cross sections of groove 102. It can then be appreciated that band 106 received in groove 102 defines or forms an outer interface surface on coupling 96.

In the most preferred form shown, provisions 94 further include a second, female coupling 108 suitably attached to the drive shaft of motor 76 for axially receiving one of male couplings 96 provided on rotary cutters 74. In particular, coupling 108 includes a hub 110 for slideable receipt on the drive shaft of motor 76 in an axially fixed and nonrotatable condition relative to the drive shaft. An annular flange 112 extends radially from hub 110. A cylindrical body 114 extends axially from the perimeter of flange 112 and concentric to the axis of the drive shaft of motor 76. Body 114 includes an inside interface surface 116 extending at a nonparallel angle to the axis of the drive shaft of motor 76 and in the most preferred form extends at an angle in the order of 10° outwardly away from the axis of the drive shaft of motor 76 and the rotation axis of cutter 74 from flange 112 towards the free axial end of body 114. In the most preferred form, the angle of surface 116 corresponds to and is generally equal to the angle of portion 100*a*. The size or diameter of surface 116 is generally equal to and for slideably receiving the outer diameter of band 106 received in groove 102 of coupling 96.

It should be appreciated that suitable shields such as a cabinet can be provided to prevent access to slide plate 32 when it is being slid by hydraulic cylinder 44 but still allow access to allow removal and replacement of die 42*a* or 42*b* including the associated rotary cutter 74 from openings 38 which is not in axial alignment with barrel 14. Suitable electrical interlocks can be provided to prevent operation of cylinders 44 and/or 77 when the access doors are open for safety reasons.

Now that the basic construction of mechanism 10 according to the preferred teachings of the present invention has been set forth, the operation and major advantages of mechanism 10 can be explained. For the sake of explanation, it will be assumed that slide plate 32 is in the position shown in FIG. 1 with die 42*a* axially aligned with barrel 14. In operation, food from cooker/extruder 12 is moved under pressure through barrel 14 towards and through die 42*a*, with the food extrudates passing from die 42*a* being cut to axial lengths due to the rotation of rotary cutter 74 associated with die 42*a*.

In the event that it is desired to change die 42*a* such as in the event that die 42*a* becomes partially blocked, that it is desired to form different shaped extrudates, that the rotary cutter 74 associated with die 42*a* requires servicing, and/or the like, and assuming that die 42*b* including its associated rotary cutter 74 is in position in slide plate 32, cylinder 77 can be actuated to slide motor 76 axially away from cooker/extruder 12 from its engaged position to its disengaged position to pull coupling 108 from coupling 96 while motor 76 continues to rotate the drive shaft, with couplings 96 and 108 being axially spaced and rotationally independent. After coupling 108 is pulled from coupling 96 allowing relative movement between motor 76 and rotary cutters 74 in a nonaxial direction, hydraulic cylinder 44 can be actuated to stroke slide plate 32 relative to barrel 14 in a straight linear path in the most preferred form to move die 42*a* and the associated rotary cutter 74 to be positioned out of axial alignment with barrel 14 and move die 42*b* and the associated rotary cutter 74 to be positioned in axial alignment with barrel 14. After die 42*b* is in position, cylinder 77 can be actuated to slide motor 76 axially toward cooker/extruder 12 from its disengaged position to its engaged position to axially move coupling 108 unto coupling 96 with axial end 104 of coupling 96 initially extending into coupling 108 and while motor 76 continues to rotate the drive shaft, with couplings 96 and 108 being engaged and rotate together or in other words are rotationally related. When coupling 108 is on coupling 96, motor 76 will rotate rotary cutter 74 associated with die 42*b*.

It should be noted that sliding of motor 76 and of slide plate 32 can be performed with continued operation of cooker/extruder 12, with cylinder 44 moving slide plate 32 with sufficient pressure to overcome any sliding friction created by food pushing against die 42*a* and with sufficient speed such that switching one of the dies 42*a* and 42*b* axially positioned in line with barrel 14 with the other of the dies 42*a* or 42*b* is only momentary. Thus, excessive food pressure will not be created by food pushing against slide plate 32 intermediate openings 38 during changing of dies 42*a* and 42*b*, with the sliding of slide plate 32 in the preferred form taking approximately ½ second. Additionally, as knives 90 of rotary cutters 74 always abut with the downstream face of die 42*b*, any tendency of food to bunch under and/or become sandwiched between knives 90 and die 42*b* is minimized if not eliminated, even though the extrudate can be exiting die 42*b* after it is in position but before couplings 96 and 108 are engaged causing motor 76 to rotate rotary cutter 74 of die 42*b*. Any extrudate from die 42*a* or 42*b* which is not uniformly cut and/or which has excessive length during the time typically in the range of less than fifteen seconds and when dies 42*a* or 42*b* are repositioned and/or when rotary cutter 74 is not being rotated by motor 76 can be disposed of in any desired manner.

It should then be appreciated that with die 42*b* in axial alignment with barrel 14, die 42*a* and rotary cutter 74 associated therewith can be removed from opening 38 of slide plate 32 and can be unplugged or otherwise serviced or can be replaced with a die of a differing configuration. In the event that it is desired to change die 42*b*, cylinder 77 can be actuated to slide motor 76 axially away from cooker/extruder 12, hydraulic cylinder 44 can be actuated to stroke slide plate 32 in the opposite direction to again position die 42*b* out of axial alignment with barrel 14 and position die 42*a* in axial alignment with barrel 14 and cylinder 77 can be actuated to slide motor 76 toward cooker/extruder 12 to rotate rotary cutter 74 associated with die 42*a*.

Prior to the present invention, when die 42*a* became plugged, it was often necessary to remove multiple fasteners which attached die 42*a* to cooker/extruder 12 to change the plugged die 42*a* with a clean die 42*b*. The head including the plugged die 42*a* was then replaced with a spare head including the clean die 42*b*. Then, each of the fasteners were replaced. This change typically took about one hour to accomplish. Alternatively or additionally, when rotary cutter 74 needed servicing such as a result of food build up on the knives, replacement of knives, or the like, it was necessary to shut down cooker/extruder 12 for the servicing of rotary cutter 74. Using mechanism 10 according to the preferred teachings of the present invention, changing a plugged die 42*a* and/or rotary cutter 74 requiring servicing with a clean die 42*b* and/or a serviced rotary cutter 74 only takes about one and one-half seconds, with this change being accomplished by simply actuating cylinders 44 and 77 and specifically without requiring removal and replacement of fasteners between cooker/extruder 12 and die 42*a* and 42*b* and/or shutting down cooker/extruder 12. Thus, there is a direct production gain of about one hour multiplied by the extrudate production rate per minute for cooker/extruder 12 utilizing mechanism 10 according to the teachings of the present invention.

In addition to this directly observable reduction in the amount of time required to change dies 42*a* and 42*b* and/or rotary cutters 74, there are numerous indirect benefits. For example, prior to the present invention, the operator of cooker/extruder 12 could not personally change die 42*a* and/or axially move the prior rotary cutter away from and toward dies 42*a* and 42*b*. Rather, one or more maintenance workers had to be found to substitute die 42*a* and move the prior rotary cutter. Unfortunately, maintenance workers may not be readily available when the need for the clean die 42*b* and/or serviced rotary cutter 74 occurs. Thus, the operator was faced with a choice between two undesirable alternatives. First, the operator could continue to make off-specification product. In the alternative, the operator could shut down cooker/extruder 12 until maintenance workers could be found to substitute die 42*a* and/or rotary cutter 74. Using mechanism 10 according to the preferred teachings of the present invention, die 42*b* and a serviced rotary cutter 74 can be substituted by the operator personally. Thus, the time looking for maintenance workers is also recovered. This is also a significant advantage when numerous cooker/extruders 12 are desired to be started simultaneously such as following down weekends.

Another indirect advantage is an increase in product quality. Due to the time requirements and inconvenience of changing dies 42a and/or rotary cutters 74 prior to the present invention, changeovers of dies 42a and/or rotary cutters 74 do not occur as often as they should. As a result, cooker/extruders 12 having dies 42a which are partially plugged and/or rotary cutters 74 which required servicing are continued to be operated, forming inferior product, until the plugging and/or cutting becomes more severe. Additionally, the come-up time to steady state conditions for cooker/extruders 12 can be considerable, on the order of ½ to 1 hour. If cooker/extruder 12 is shut down for more than a few seconds (such as for substituting die 42a and/or for servicing rotary cutter 74 prior to the present invention and/or finding maintenance workers to perform the substitution), cooker/extruder 12 can lose its steady state conditions. Specifically, the material being held in cooker/extruder 12 experiences an overcook and subsequent increase in viscosity. In order to get this overcooked product out of cooker/extruder 12, additional water must be added. When cooker/extruder 12 is restarted, an initial 35 to 45 minutes of production is lost as off-specification product in cooker/extruder 12 is produced/extruded to allow cooker/extruder 12 to come up to steady state conditions. As mechanism 10 according to the preferred teachings of the present invention allows dies 42a and rotary cutter 74 to be changed without shutting down cooker/extruder 12, loss of steady state conditions does not occur and the recovery time of cooker/extruder 12 is reduced from approximately one hour to nothing. Typically, dies 42a and 42b require changing more frequently than rotary cutters 74 require servicing, with dies 42a and 42b requiring change every 8½ to 24 hours. Thus, the total production time of cooker/extruder 12 producing specification product can be increased by at least 1½ to 2 hours resulting in increased production when die 42a and rotary cutter 74 are replaced utilizing mechanism 10 according to the preferred teachings of the present invention over typical prior die replacement techniques.

Furthermore, provisions 94 according to the teachings of the present invention are believed to be advantageous and produce synergistic results with mechanism 10 according to the teachings of the present invention. Specifically, provisions 94 allow the connection and disconnection of a rotatable input (the rotatable shaft of motor 76 in the preferred form shown) to an output (the annular cutter head 82 of rotary cutter 74 which is also rotatable in the preferred form shown) and allowing nonaxial movement between the rotatable input and the output when disconnected by simply axially moving couplings 96 and 108 relative to each other and specifically without requiring the operator to insert pins or other connector members between couplings 96 and 108. Thus, provisions 94 allow the connection and disconnection and allow the nonaxial movement to be made on the fly or in other words with the shaft of motor 76 continuously rotating and without requiring motor 76 to be stopped. The friction between band 106 and inside surface 116 provides a generally nonslip relation between couplings 96 and 108, with the angular relation of portion 100a and of inside surface 116 allowing coupling 96 to be inserted into coupling 108 with increasing torque transfer therebetween. Furthermore, the preferred construction of provisions 94 allows rotational interconnection between couplings 96 and 108 even if the rotational axes defined by the rotational shaft of motor 76 and center shaft 80 are not aligned and/or parallel to each other which can be a problem when the input and output are moveable in nonaxial directions relative to each other. Further, since provisions 94 allow relative movement in a nonaxial direction between motor 76 and rotary cutters 74, a single motor 76 can be used to rotate two (or more) rotary cutters 74 and thereby reducing capital costs as motor 76 is relatively expensive.

Figure 4:
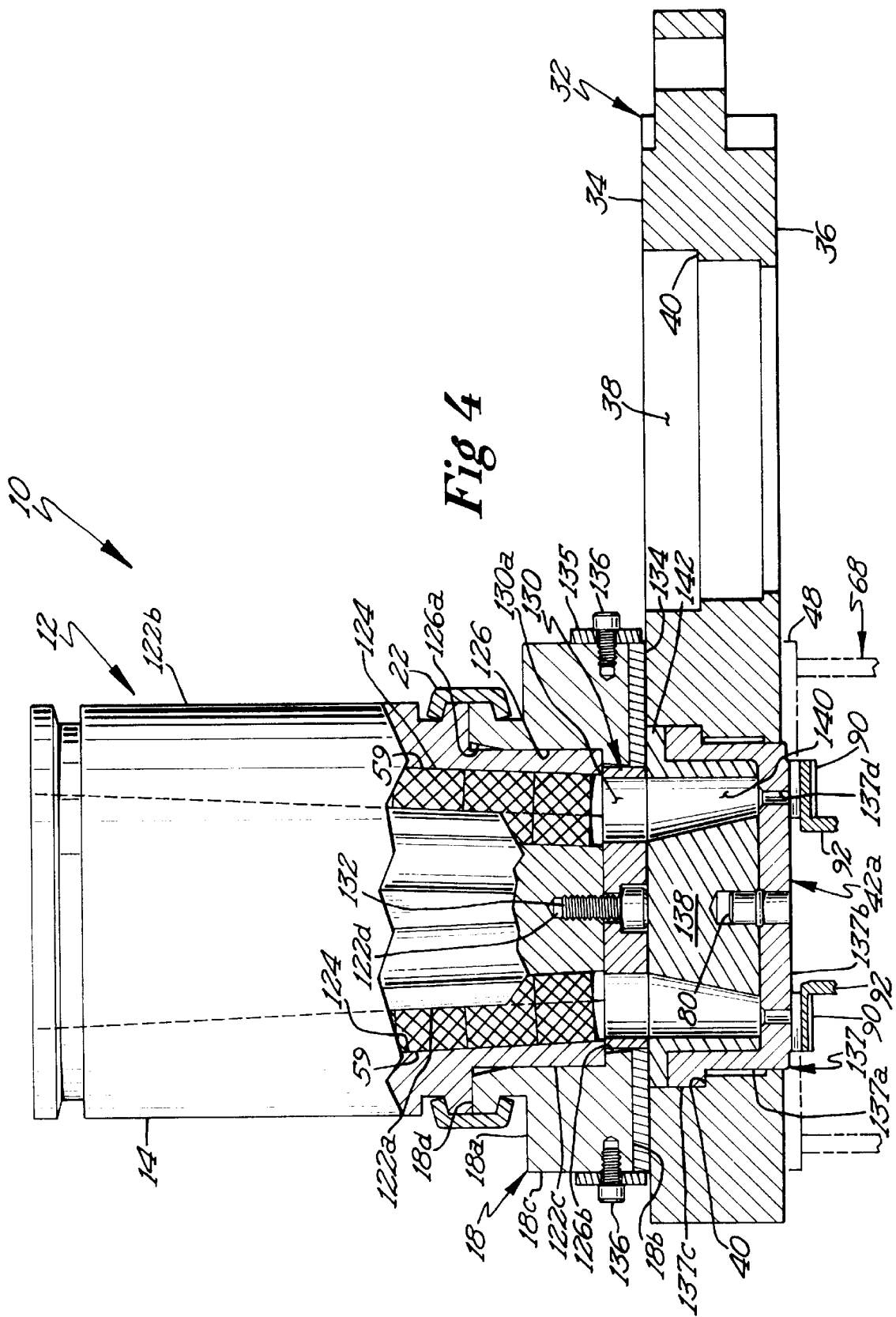
FIG. 4 shows a partial, cross-sectional view of the cooker die removably securing mechanism of FIG. 1, with portions shown in phantom and other portions shown broken away.
Figure 5:
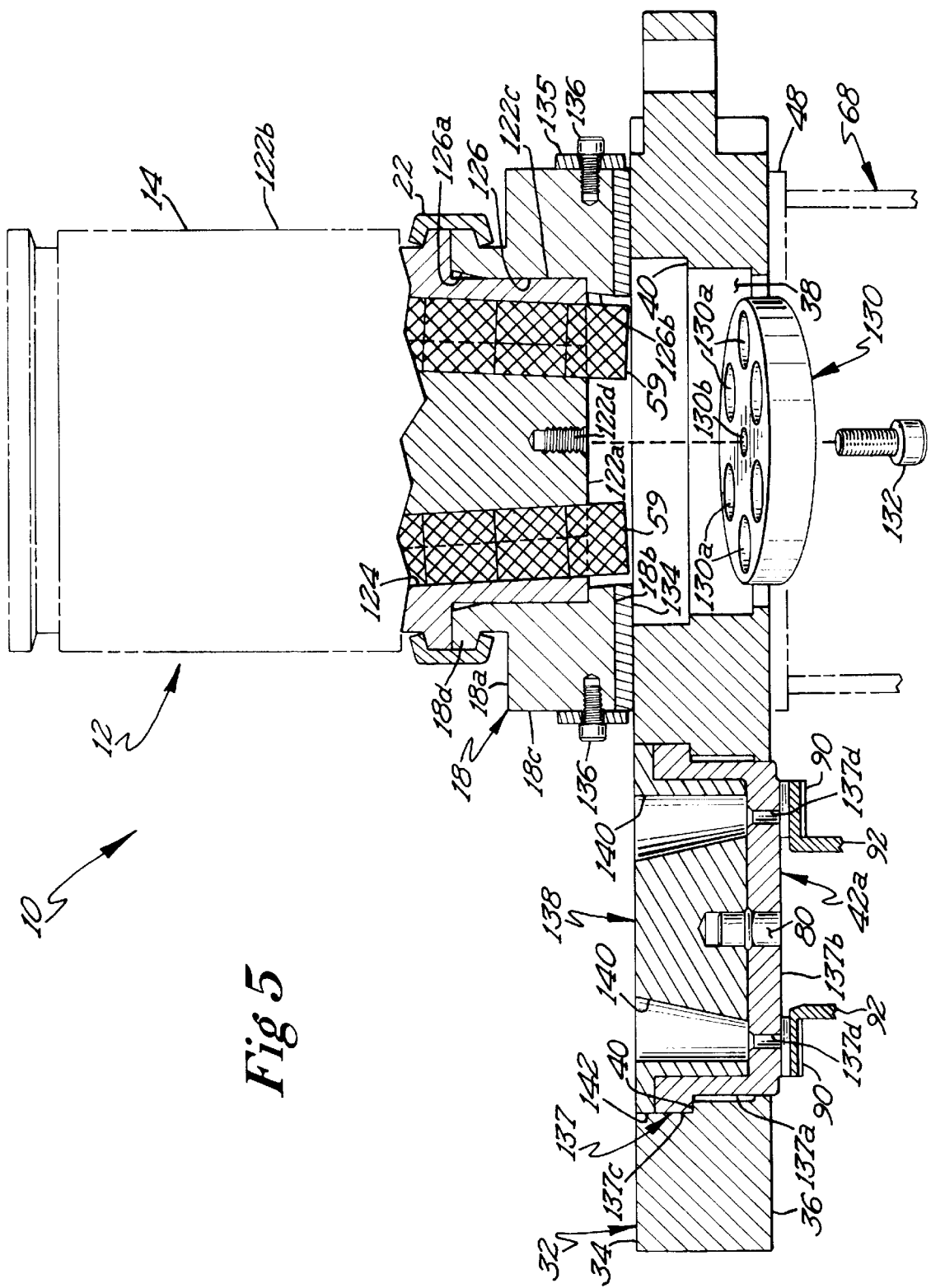
FIG. 5 shows a partial, cross-sectional view of the cooker die removably securing mechanism of FIG. 1 in a different position than FIG. 4, with portions being exploded and other portions shown in phantom.

In other preferred aspects of the present invention, mechanism 10 according to the teachings of the present invention is especially advantageous in allowing the servicing of cooker/extruder 12 and is particularly advantageous in allowing the servicing of cooker/extruder 12 of the type of FIGS. 6 and 7 of U.S. Pat. No. 5,776,534 and of U.S. Pat. No. 5,919,509. In particular and in the preferred form, barrel 14 is of a unique construction allowing access to mixer elements 59 in the flow passages, with mixer elements 59 in the most preferred form being static mixer elements of any conventional variety. Specifically, in the most preferred form of the present invention, barrel 14 is formed of a central plug 122a and an outer sleeve 122b. Central plug 122a has planar first and second ends. Central plug 122a further includes an outer surface having circular cross sections and in the most preferred form is frustoconical. Sleeve 122b has planar first and second ends. Sleeve 122b further includes an outer surface which is generally cylindrical in the preferred form and an inner surface having circular cross sections and in the most preferred form being frustoconical and of a size and shape for slideably receiving and abutting with the outer frustoconical surface of central plug 122a. During the formation of barrel 14, central plug 122a is slideably received in sleeve 122b with the outer frustoconical surface of central plug 122a abutting with the inner frustoconical surface of sleeve 122b. Subpassageways 124 which in the most preferred form are of a circular cross section are then bored or drilled with their axes generally located along the frustoconical surfaces of plug 122a and sleeve 122b so that generally half of each of the subpassageways 124 is formed in plug 122a and the other half is formed in sleeve 122b. It should then be appreciated that with the centers of subpassageways 124 located on the frustoconical surfaces of plugs 122a and sleeve 122b, the centers of subpassageways 124 have gradually decreasing spacing as best seen in FIGS. 4 and 5 from the first ends to the second ends of plug 122a and sleeve 122b.

In the most preferred form, frame element 18 is generally of a rectangular configuration including an upstream face 18a, a downstream face 18b, first and second sides 18c extending in a direction generally perpendicular to the slide direction of slide plate 32, and upper and lower portions extending in a direction generally parallel to the slide direction of slide plate 32 and to which pressure plates 48 are held in the most preferred form. A cylindrical projection 18d extends upstream from the upstream faces 18a of sides 18c and the upper and lower portions. Frame 18 includes a central aperture 126 extending from the axial end of projection 18d to downstream face 18b, with aperture 126 including an enlarged portion 126a extending from the axial end of projection 18d towards but spaced from downstream face 18b and a reduced portion 126b extending from downstream face 18b to and intersecting with enlarged portion 126a. In the most preferred form, the outer surface of sleeve 122b includes a stepped down portion 122c of a size for slideable receipt in enlarged portion 126a. When barrel 14 is slideably received within central aperture 126 with the downstream end of sleeve 122b of barrel 14 abutting with the shoulder defined at the intersection of portions 126a and 126b of aperture 126, the axial end of projection 18d abuts with the shoulder defined at the intersection of stepped down portion 122a and the outer surface of sleeve 122b. It can then be appreciated that when barrel 14 is slideably received within central aperture 126 of frame element 18, downstream face 18b is spaced axially downstream of the downstream end of sleeve 122b and of barrel 14. Projection 18d includes the groove for receiving clamp 22 in the most preferred form which secures frame element 18 relative to barrel 14 when barrel 14 is received in central aperture 126 of frame element 18.

In the most preferred form, a center retainer plate 130 is provided having an outer perimeter of a shape and size for slideable receipt in reduced portion 126b of central aperture 126 of frame element 18 and is fixed relative to barrel 14. Center retainer plate 130 is formed of material for reduced sliding friction but which can provide a seal against the escape of food and in the most preferred form is formed of aluminum and bronze. Plate 130 has parallel, planar, upstream and downstream faces having a spacing greater than the spacing between downstream face 18b and the shoulder defined by portions 126a and 126b such that the downstream face of plate 130 is spaced axially downstream of downstream face 18b of frame element 18. Plate 130 includes subpassageways 130a of a number, location and size corresponding to and in line with subpassageways 124 of barrel 14. It should be appreciated that subpassageways 130a have a relationship with subpassageways 124 to prevent mixer elements 59 located in subpassageways 124 from exiting through the downstream end of subpassageways 130a even though mixer elements 59 are insertable and removable from the downstream end of subpassageway 124, and which do not include any steps, ledges, shoulders or the like against which food flowing through subpassageways 124 and 130a would abut or stop. Specifically, in the most preferred form, subpassageways 130a have a diameter only slightly smaller than subpassageways 124, and the centers of subpassageways 130a are parallel and thus have equal spacings whereas the centers of subpassageways 124 have gradually decreasing spacing. Thus, the axes of subpassageways 130a and 124 are not parallel. Plate 130 is suitably fixed relative to and preferably secured to barrel 14 to be an extension thereof and in the preferred form secured in a manner which does not extend beyond the downstream face of plate 130. In the most preferred form, plate 130 includes a counterbored passage 130b at its axial center for receipt of a suitable fastener 132 threaded into threaded bore 122d in central plug 122a of barrel 14. Plate 130 can further include threaded apertures adjacent the periphery thereof but intermediate subpassageways 130a for threadable receipt of bolts or the like upon which axial removal forces can be applied for removing plate 130 from portion 126b of aperture 126.

A wear plate 134 is provided in the preferred form formed of the same material as retainer plate 130 and particularly of aluminum and bronze for reduced sliding friction but which can provide a seal against the escape of food. Plate 134 has parallel, planar, upstream and downstream faces having a spacing generally equal to the spacing of and coextensive with the downstream face of plate 130 from face 18b of frame element 18. Plate 134 includes a central aperture of a size and shape for slideable receipt on the outer periphery of plate 130. Plate 134 is sandwiched between downstream face 18b of frame element 18 and upstream surface 34 of slide plate 32. Plate 134 is suitably prevented from moving parallel to face 18b and surface 34 such as by having the outer periphery of a size and shape corresponding to frame element 18, with retaining plates 135 suitably secured to sides 18c such as by bolts 136 and abutting with the outer periphery of plate 134. In the most preferred form, the downstream ends of plates 135 are axially spaced upstream of the downstream face of plate 134.

In the preferred form, openings 38 have a larger size at upstream surface 34 than at downstream surface 36 and in the most preferred form are stepped to form a radially extending shoulder 40.

Dies 42a and 42b according to the preferred teachings of the present invention each includes a die head 137 and a registration section 138. Die head 137 is generally cup or hat shaped and generally includes a cylindrical portion 137a terminating in an end plate portion 137b and a radial flange 137c extending from the free end of portion 137a opposite to portion 137b. Flange 137c has an outer periphery of a size and shape corresponding to and for slideable receipt in openings 38 and has an axial thickness less than the axial spacing of shoulder 40 from upstream surface 34. The outer surface of portion 137a is of a size generally corresponding to and for slideable receipt in openings 38 at downstream surface 36. When die head 137 is received within openings 38 with flange 137c abutting with shoulder 40, the downstream face of portion 137b is axially spaced from downstream surface 36 of plate 32 in the most preferred form. Die ports 137d of a number and arrangement corresponding to subpassageways 124 and 130a are provided in portion 137b but of a smaller size and in the preferred form having axes at a greater radial distance than the axes of subpassageways 130a.

Registration section 138 has a shape and size corresponding to and for receipt within die head 137. Section 138 includes connecting passages 140 extending between and in communication and in line with subpassageways 130a and ports 137d, with passage 140 decreasing in size and being generally funnel shaped between subpassageways 130a and ports 137d. In this regard, section 138 can include cavities and channels according to the teachings of U.S. Pat. No. 5,919,509 to bleed a portion of the food mass from one subpassageway 130a and to feed the bled portion to one or more ports 137d in communication with other subpassageways 130a. It should then be appreciated that subpassageways 124 and 130a, passages 140, and ports 137d are generally contiguous and do not present shoulders or similar projections in the flow of extrudable food to minimize buildup and hardening. The upstream end of section 138 includes a radially extending flange 142 having an axial thickness generally equal to the spacing of the upstream face of die head 137 and upstream surface 34 of slide plate 32 such that the upstream surface of section 138 is generally contiguous with upstream surface 34 of slide plate 32 when the downstream surface of section 138 abuts with flange 137c. Flange 142 has an outer periphery of a size and shape corresponding to and for slideable receipt in openings 38. Flanges 137c and 142 comprise a flange portion of die 42a or 42b. Openings 38 and the outer periphery of flange 142 at surface 34 have a diameter greater than the diameter of the outer periphery of plate 130. Section 138 can be formed of any suitable material to provide sealing with plate 130 to prevent leakage of dough and to provide reduced sliding friction between plates 130 and 134 but which resists wear.

In the preferred form shown in FIGS. 4 and 5, shaft 80 extends through end plate portion 137b of die head 137 and is retained in place by a snap ring which abuts with the upstream face of portion 137b. Registration section 138 includes a suitable socket for receipt of shaft 80 and the snap ring received thereon.

It should then be appreciated the configuration of, arrangement of and materials forming the components of mechanism 10 and in particular retainer plate 130 and wear plate 134 according to the preferred teachings of the present invention are particularly advantageous in the ability to allow sliding of slide plate 32 relative to barrel 14 without leakage of food. In particular, the pressure between frame element 18 and slide plate 32 and dies 42a and 42b can be adjusted by the placement of shims of desired thickness between frame element 18 and pressure plates 48 so that the pressure of food will generally not separate and pass radially between center plate 130 and registration section 138 and will not separate and pass between wear plate 134 and registration section 138 and/or slide plate 32 outside of openings 38. This is of significant importance when multiple flow passages are provided between barrel 14 and slide plate 32 such as six in the most preferred form, because the distance between the flow passages are relatively short requiring reduced clearance between the components to prevent leakage. However, due to the material from which plates 130 and 134 are formed, sliding of plate 32 relative to plates 130 and 134 under the force of cylinder 44 is still possible. Additionally, retainer plate 130 and wear plate 134 are formed of flat stock which can be easily fabricated, with plates 130 and 134 being sacrificial components to reduce wear on the other components and especially dies 42a and 42b, slide plate 32, frame element 18, and barrel 14.

Similarly, when multiple flow passages are provided between barrel 14 and dies 42a or 42b such as six in the most preferred form of the present invention, it is necessary that the flow passages be located relatively close to each other and thereby requiring better sealing of the flow passages. Conventional thinking would be to provide individual seals for each flow passage. However, if individual seals were provided for each flow passage, there is increased risk of dislodging the individual seals as the result of movement of slide plate 32, especially in the environment where multiple flow passages are provided. The configuration of, arrangement of, and material forming retainer plate 130 allow sealing of multiple flow passages according to the teachings of the present invention with a single component having minimal risk of dislodging as the result of movement of slide plate 32.

Additionally, the configuration and arrangement of the components of mechanism 10 according to the preferred teachings of the present invention is particularly advantageous in the ability to service barrel 14 and is believed to produce synergistic results when utilized with slide plate 32. In particular, it is often necessary to remove mixer elements 59 from subpassageways 124. As an example, a slug of hardened or thickened dough could pass from cooker/extruder 12 into subpassageways 124 which would plug in mixer elements 59, requiring their replacement. Similarly, if cooker/extruder 12 was offline for an extended period, dough could harden or thicken sufficiently in mixer elements 59 to prevent flow requiring removal of mixer elements 59. Likewise, when it is desired to shut down cooker/extruder 12 such as over a long weekend, mixer elements 59 are required to be removed for cleaning, with it being desirable to provide a convenient way to allow such removal. Prior to the present invention, substantial disassembly was required to remove mixer elements 59 which had to be reassembled to place cooker/extruder 12 back online.

For purpose of explanation, it is assumed that slide plate 32 of mechanism 10 according to the preferred teachings of the present invention is being utilized to removably secure die 42a or 42b to frame element 18 and that die 42a is in an opening 38 in slide plate 32 and axially in line with barrel 14 as shown in FIG. 4. Die 42b, if in place, is removed from plate 32 as shown in FIG. 4. Slide plate 32 can then be slid with cylinder 44 so that opening 38 without die 42a or 42b is positioned directly in line with barrel 14 as shown in FIG. 5. It can then be appreciated that due to the smaller diameter of center plate 130 than opening 38, center plate 130 can be removed from barrel 14. In particular, fastener 132 can be unthreaded from bore 122d of central plug 122a and removed. At that time, center plate 130 can be slid out of central aperture 126 of frame element 18, out of wear plate 134, and out of and through opening 38 of slide plate 32 in alignment with central aperture 126 of frame element 18 (such as by placing removal forces on bolts threaded into center plate 130 for that purpose). Assuming that the flow of food has been stopped, flow of food is again commenced. However, with the removal of center plate 130, mixer elements 59 are free to slide from subpassageways 124 as the force to slide mixer elements 59 from subpassageways 124 is less than to force food through mixer elements 59. It can then be appreciated that this can be accomplished without removing mechanism 10, slide plate 32 and/or barrel 14 from frame element 18. Thus, servicing and cleaning of barrel 14 and mixer elements 59 can be accomplished according to the teachings of the present invention without requiring the substantial disassembly (and reassembly) as was previously required.

Additionally, it should be appreciated that the particular manner of retaining wear plate 134 in position according to the preferred teachings of the present invention is particularly advantageous as no bolts extend through wear plate 134 between the upstream and downstream faces thereof. The heads of such bolts may have a tendency to engage slide plate 32 and/or dies 42a and 42b over time, especially after wear of wear plate 134. However, more importantly, mechanism 10 according to the teachings of the present invention provides ease of replacement of wear plate 134 without requiring removal of slide plate 32. In particular, after removal of plate 130 from barrel 14 through die opening 38 and after retaining plates 135 have been removed, wear plate 134 can be moved parallel to face 18b and surface 34 from between frame element 18 and slide plate 32 and replaced with a different wear plate 134 in the same manner.

Now that the basic teachings of the present invention have been explained, many extensions and variations will be obvious to one having ordinary skill in the art. For example, although mechanism 10 of the most preferred form includes the combination of several, unique features believed to obtain synergistic results, mechanisms for removably securing dies and/or rotary cutters, connection and disconnection mechanisms, and/or rotary cutters could be constructed according to the teachings of the present invention including such features singly or in other combinations. As an example, mechanism 10 could be utilized according to the teachings of the present invention with other manners of allowing connection and disconnection of motor 76 with rotary cutters 74, or the like. Similarly, provisions 94 could be utilized in environments other than connecting and disconnecting motor 76 to rotary cutters 74 according to the teachings of the present invention. Likewise, although slide plate 32 is slid in a straight linear path in the preferred form, mechanism 10 could include provisions for mounting and/or sliding slide plate 32 including two or more die openings 38 in other manners utilizing the teachings of the present invention including but not limited to arcuately. Additionally, although rotary cutters 74 are rotatably mounted to dies 42a and 42b in the most preferred form, rotary cutters 74 could have other configurations and could be mounted for movement with dies 42a and 42b and slide plate 32 including but not limited to directly to slide plate 32 according to the teachings of the present invention. Furthermore, it can be appreciated that couplings 96 and 108 can be reversed from that shown and described according to the teachings of the present invention. Likewise, it can be appreciated that center plate 130 for removably retaining mixer elements 59 in subpassageways 124 can be utilized with other manners of removably securing die 42a to cooker/extruder 12 and/or with other manners of mounting rotary cutter 74 including but not limited to conventional manners. Similarly, die 42a or 42b can have a variety of constructions according to the teachings of the present invention, with the form shown being one of many preferred forms each having their particular advantages and applications.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Mechanism for removably securing a die to a food cooker/extruder including a barrel having at least a first subpassageway having a downstream end, with at least one mixer element insertable into and removable from the first subpassageway from the downstream end, comprising, in combination: a frame element including a central aperture for slideable receipt of the barrel; means for securing the frame element relative to the barrel with the barrel received in the central aperture; a center plate received within the central aperture of the frame element and fixed relative to the barrel, with the center plate having at least a first subpassageway section in line with the first subpassageway, with the center plate preventing the mixer element from passing from the downstream end of the first subpassageway, with the die being removably secured to the frame element and including at least a first connecting passage in line with the first subpassageway section, with the mixer element being removable from the first subpassageway when the die is removed from the frame element and the center plate is removed from the barrel and while the frame element is secured relative to the barrel by the securing means.

2. The mechanism of claim 1 wherein the first subpassageway, the first subpassageway section, and the first connecting passage are generally contiguous and do not present shoulders in the flow of food to minimize buildup and hardening.

3. The mechanism of claim 2 wherein the axis of the first subpassageway and the axis of the first subpassageway section are not parallel.

4. The mechanism of claim 3 wherein the barrel comprises a central plug and an outer sleeve, with the first subpassageway being partially formed in the central plug and partially formed in the outer sleeve.

5. The mechanism of claim 4 wherein the central plug has an outer surface having circular cross sections and the outer sleeve has an inner surface having circular cross sections of a size and shape for slideable receipt and abutment with the outer surface of the central plug.

6. The mechanism of claim 5 wherein the outer surface of the central plug and the inner surface of the outer sleeve are frustoconical.

7. The mechanism of claim 1 further comprising, in combination: a slide plate having an upstream surface, a downstream surface and at least first and second die openings extending from the upstream surface to the downstream surface for receiving dies; means for sliding the slide plate for positioning one of the die openings in alignment with the central aperture of the frame element, with the die received in one of the die openings and being removably secured to the frame by the slide plate with the first connecting passage of the die received in the die opening aligned with the aperture of the frame being in line with the first subpassageway section, with the die openings being of a size and shape allowing removal of the center plate from the barrel by passage through said one of the die openings in alignment with the central aperture of the frame element.

8. The mechanism of claim 7 further comprising, in combination: an annular wear plate having a downstream face and an upstream face and sandwiched between the barrel and the upstream surface of the slide plate, with the center plate passing through the wear plate, with the center plate having a downstream face coextensive with the downstream face of the wear plate.

9. The mechanism of claim 8 wherein the frame element includes an outer periphery; wherein the wear plate has an outer periphery; and wherein the mechanism further comprises, in combination: retaining plates secured to the outer periphery of the frame element and abutting with the outer periphery of the wear plate, with the wear plate being free of securement extending through the downstream and upstream faces of the wear plate.

10. The mechanism of claim 8 wherein the wear plate and the center plate are sacrificial and formed of aluminum and bronze.

11. The mechanism of claim 8 wherein the die openings have a larger size at the upstream surface of the slide plate than the downstream surface of the slide plate to form a radially extending shoulder, with the die including a radially extending flange portion abutting with the radially extending shoulder of the die opening and having an upstream face coextensive with the upstream surface of the slide plate.

12. The mechanism of claim 7 wherein the sliding means comprises means for sliding the slide plate in a straight linear path.

13. The mechanism of claim 7 further comprising, in combination: at least a first rotary cutter rotatably mounted about a rotation axis to abut with the die received in the die opening.

14. The mechanism of claim 13 further comprising, in combination: a second rotary cutter, with the first rotary cutter being carried by the slide plate and associated with the die received in the first die opening, with the second rotary cutter being carried by the slide plate and associated with the die received in the second die opening.

15. The mechanism of claim 14 further comprising, in combination: means for providing rotation to the rotary cutters; and means for disconnecting the rotation providing means from the rotary cutter when it is desired to slide the slide plate and for connecting the rotation providing means to the rotary cutter aligned with the central aperture of the frame element.

16. The mechanism of claim 13 wherein the rotary cutter includes a center shaft extending axially from the die.

17. Mechanism for removably securing a die to a food cooker/extruder including a barrel having at least a first subpassageway, comprising, in combination: a frame element including a central aperture for slideable receipt of the barrel; means for securing the frame element relative to the barrel with the barrel received in the central aperture; a center plate received within the central aperture of the frame element and fixed relative to the barrel, with the center plate having at least a first subpassageway section in line with the first subpassageway; a slide plate having an upstream surface, a downstream surface and at least first and second die openings extending from the upstream surface to the downstream surface for receiving dies; means for sliding the slide plate for positioning one of the die openings in alignment with the central aperture of the frame element, with the die being received in one of the die openings and being removably secured to the frame by the slide plate, with the die including at least a first connecting passage in line with the first subpassageway section when the die opening in which the die is received is aligned with the aperture of the frame, with the die openings being of a size and shape allowing removal of the center plate from the barrel by passage through said one of the die openings in alignment with the central aperture of the frame element; and an annular wear plate having a downstream face and an upstream face and sandwiched between the barrel and the upstream surface of the slide plate, with the center plate passing through the wear plate, with the center plate having a downstream face coextensive with the downstream face of the wear plate.

18. The mechanism of claim 17 wherein the frame element includes an outer periphery; wherein the wear plate has an outer periphery; and wherein the mechanism further comprises, in combination: retaining plates secured to the outer periphery of the frame element and abutting with the outer periphery of the wear plate, with the wear plate being free of securement extending through the downstream and upstream faces of the wear plate.

19. The mechanism of claim 18 wherein the wear plate and the center plate are sacrificial and formed of aluminum and bronze.

20. The mechanism of claim 18 wherein the barrel comprises a central plug and an outer sleeve, with the first subpassageway being partially formed in the central plug and partially formed in the outer sleeve.

21. The mechanism of claim 20 wherein the center plate has a second subpassageway section; wherein the barrel has a second subpassageway in line with the second subpassageway section; and wherein the die includes a second connecting passage in line with the second subpassageway section when the die opening in which the die is received is aligned with the aperture of the frame.

* * * * *